Jan. 26, 1960

E. C. DENCH 2,922,956

TRAVELING WAVE OSCILLATOR SYSTEMS

Filed Feb. 21, 1956

INVENTOR
EDWARD C. DENCH
BY Elmer J. Gorn
ATTORNEY

United States Patent Office 2,922,956
Patented Jan. 26, 1960

2,922,956

TRAVELING WAVE OSCILLATOR SYSTEMS

Edward C. Dench, Needham, Mass., assignor to Raytheon Company, a corporation of Delaware Application February 21, 1956, Serial No. 566,940
12 Claims. (Cl. 331—82)

This invention relates to a system for locking the frequency of at least one traveling wave oscillator with a signal from a radio frequency locking source of substantially the same frequency, and more particularly relates to an injection locking system for a traveling wave oscillator wherein reflection of energy in the system is substantially reduced.

In a copending application by Edward C. Dench and Albert D. La Rue, Serial Number 562,472, filed January 31, 1956, now United States Letters Patent No. 2,888,649, issued May 26, 1959, an improved system is described for locking the frequency of a backward wave traveling wave oscillator to the frequency of a low power source of the same order of frequency, which may be another backward wave oscillator. Although not shown in the aforesaid application, it is possible to use a different type of oscillator, such as a klystron, as the locking signal source. The locking signal from such a source is injected as an input signal into the periodic delay network at or adjacent the downstream end of the network, that is, the end thereof toward which the electron beam is directed. In backward wave oscillators, it is sometimes desirable to insert electrical attenuating means along a portion of the delay network in order to prevent substantially reflected energy within the tube from being transferred to the locking source by way of the input coupling means connected at the downstream end of the network and the external transmission path interconnecting the backward wave oscillator and the locking source. This attenuating means may be in the form of a thin coating of lossy material, such as graphite or iron, applied to the elements of the periodic network as by spraying or electroplating techniques. In some instances, the attenuating means may be located externally of the traveling wave oscillator, more specifically, in the transmission path between the traveling wave oscillator input circuit and the locking signal source.

If the locking signal from the external source is injected in the active section of the delay network at or near the junction with the active portion of the network (in cases where the attenuation is introduced internally), or if the locking signal is applied between an external attenuator and the input end of the traveling wave oscillator tube, the effect of the attenuator will be nullified. If, on the other hand, the locking signal is coupled to the delay network at the extremity of the attenuator section remote from the active portion of the delay network (in cases in which the attenuator is introduced internally), or if an external attenuator is disposed between the locking signal source and the input end of the backward wave oscillator, the locking signal will be attenuated appreciably before it reaches the junction point between the attenuator and the active portion of the delay line, in cases where the attenuation is introduced internally, or before it reaches the input end of the backward wave oscillator, in the case of attenuation external to the tube; consequently, a signal source of relatively high power is required.

In accordance with this invention, a non-reciprocal attenuator, that is, one in which the attenuation is considerably greater in one direction than in the opposite direction, is associated with the traveling wave oscillator. A ferrite isolator assembly may be utilized for providing the desired non-reciprocal attenuation. A ferrite isolator system operates on the principle that, if the magnetic field of a radio frequency wave is circularly (elliptically) polarized in a plane perpendicular to the magnetizing field associated with the ferrite, a large resonance absorption occurs at a value of the magnetizing field at which gyromagnetic resonance for the particular ferrite occurs. The sense of the circular polarization is positive with respect to the applied magnetizing field. The isolator assembly may be positioned in proximity to the delay network so that the fields thereof are coupled to it. The axial field used for focusing the electron beam in those traveling wave oscillators not employing a transverse magnetic field is suitable for magnetic biasing for the isolator. Alternatively, the isolator assembly may be disposed in an appropriate position within a wave guide interconnecting the input end of the backward wave oscillator and the locking signal radio frequency source. In this case the attenuator section within the tube may be dispensed with. In order to reduce reflections from the ends of the ferrite isolator assembly, the latter may be tapered at the ends to provide a suitable impedance match.

For a better understanding of the invention, together with further objects thereof, reference is made to the following description taken in conjunction with the accompanying drawing wherein.

Figure 1:
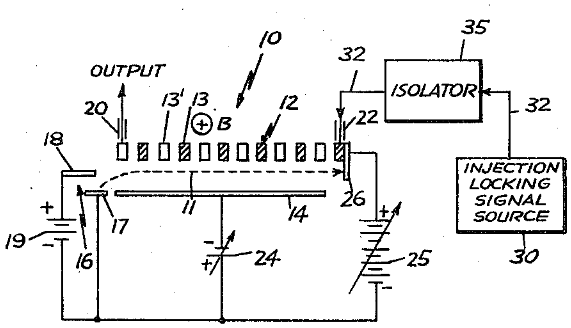
Fig. 1 is a schematic diagram of a traveling wave oscillator system according to the invention.

Referring to Fig. 1, a backward wave traveling wave oscillator is indicated schematically and may be similar to that shown and described in the aforesaid copending application. The oscillator shown in Fig. 1 comprises an anode including a periodic slow wave energy propagating structure or anode delay line 12, an elongated electrode 14, sometimes referred to as a sole, which is arranged coextensively with the delay line 12 and maintained negative with respect thereto, an electron gun 16, output coupling means 20 adjacent the upstream end of said delay line, that is, the end thereof electrically adjacent the electron gun, and an input coupling means 22 located at the other end of the delay line. The anode delay line 12 is shown by way of example as an interdigital line having a plurality of interdigital fingers or elements 13 and 13′, each of which is connected together for direct current. The electron gun 16 includes an electron source or cathode 17 and an accelerating anode 18 adjacent the cathode. Electrode 18 is maintained positive with respect to the cathode 17 by means of a source 19 and assists in achieving the desired electron beam trajectory. The sole 14 may be negatively biased with respect to the cathode by means of a source 24, although, in some instances, the cathode may be at the same potential as the sole. This bias voltage source 24 may be necessary in some instances to compensate for individual differences in construction of the locked oscillator and the locking oscillator, where both oscillators are of the traveling wave type, and in applications in which two or more traveling wave oscillators are connected in tandem to a locking source, to compensate for individual differences in the various traveling wave oscillators so connected in tandem. A description of a system incorporating several oscillators is shown in Fig. 7 of the aforementioned copending application.

A suitable electric field between the anode delay line 12 and sole 14 may be obtained by means of a unidirectional voltage applied therebetween; the anode delay line 12 is maintained at a positive potential relative to both the sole and the cathode by means of a source 25 of voltage connected in series with the bias voltage source 24, if any, between any point on the anode delay line 12 and some point on sole 14. As shown in Fig. 1, the oscillator 10 is of the transverse-magnetic-field-type, in which the electron beam 11 is under the combined influence of the aforesaid electric field between anode delay line 12 and sole 14, and a magnetic field transverse to this electric field; the electron beam is mutually perpendicular to the direction of both fields. The transverse magnetic field is indicated by the letter B and the direction of this field is indicated by the arrow enclosed within a circle. Tuning of the oscillator 12 may be accomplished either by varying the voltage source 24, as previously described, or by varying the voltage of source 25 connected between the delay line 12 and sole 14. Tuning of the oscillator 12 may also be accomplished by varying the strength of the transverse magnetic field B. Although the periodic network 12 is shown in Fig. 1 as an interdigital line having a plurality of interdigital fingers or elements, the delay network 12 need not be of the interdigital type; for example, any suitable periodic delay structure, such as a helix, a vane structure, or the like, may be used.

Energy is removed from the end of the periodic anode delay structure 12 electrically adjacent the electron gun 16 by means of an output coupling device 20 which may be a coaxial line whose inner conductor is connected directly to one of the fingers of the periodic structure 12. The locking signal from the injection locking signal source 30 is applied to an external transmission line 32 which may consist of a wave guide containing therein a ferrite isolator assembly 35. After passage through this isolator system, energy transmitted along the transmission line 32 is applied to the input coupling device 22 of the traveling wave tube 10; this input device 22 is located at or near the downstream end of tube 10, that is, the end of the anode delay line 12 electrically remote from the output coupling 20. The input coupling means is indicated in Fig. 1 as a coaxial line similar to the output coupling means 20. A conventional coaxial line-to-wave guide transition, such as indicated in Fig. 3, may be used for the connection between the input coupling means 22 and the external transmission network; alternatively, however, a wave guide input coupling means may be used rather than the coaxial input means shown.

Figure 2:
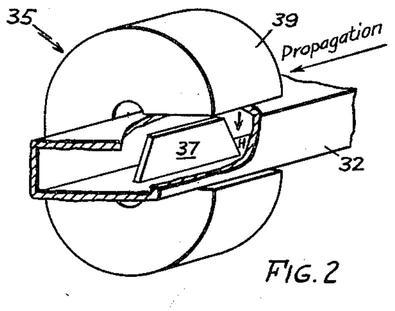
Fig. 2 is a detail view of a portion of the external non-reciprocal transmission network used in the system of Fig. 1.

The ferrite isolator assembly 35 for use in a rectangular wave guide propagating energy in the dominant or $TE_{01}$ mode is indicated in detail in Fig. 2. The isolator assembly of Fig. 2 consists of a ferrite slab 37 asymmetrically located within the wave guide; the isolator also includes means for producing a biasing magnetic field H in the direction indicated by the arrow, that is, in a direction parallel to the electric field vector of the $TE_{01}$ mode. This magnetic field may be provided by a magnet 39 whose pole pieces are disposed on opposite sides of the wave guide, as indicated in Fig. 2. The biasing magnetic field is set at or near the value required for ferromagnetic resonance. The exact position of the ferrite slab in the wave guide is best determined empirically; however, an effective isolator has been obtained wherein the ferrite slab is spaced approximately one quarter of the wide dimension of the wave guide away from one narrow wall. In some cases, the ferrite slab may be in actual contact with one of the narrow walls of the wave guide, as shown in the device of Fig. 3. The position of the ferrite slab will, of course, depend upon the field configuration within the wave guide. The ferrite isolator assembly is positioned at a point where the ratio of the positively circularly polarized component of the magnetic field to the negative circularly polarized component is high. With the arrangement shown in Fig. 2, there will be considerably less attenuation in the direction indicated by the arrow labeled "Propagation" than in the opposite direction; that is to say, energy traveling from right to left along wave guide 32 in Figs. 1 and 2 will undergo considerably less attenuation than energy traveling from left to right along the wave guide.

One example of a ferrite suitable for use in a ferrite isolator assembly is a magnesium-manganese ferrite consisting of about 36%, 6%, and 58%, respectively, of oxides of iron, manganese, and magnesium.

Figure 3:
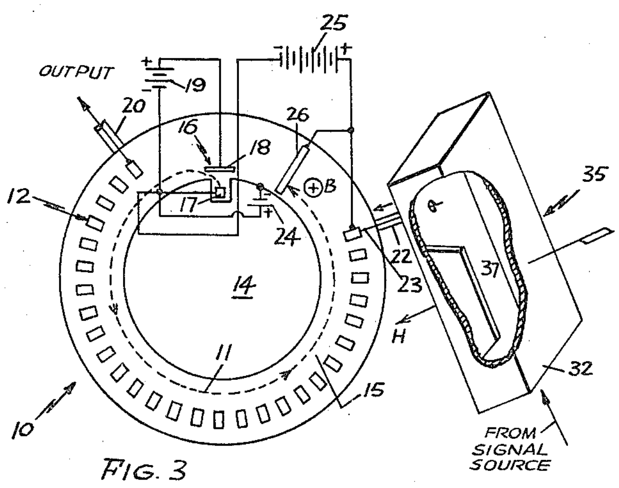
Fig. 3 is a view illustrating a system analogous to that of Fig. 1, employing a traveling wave oscillator of arcuate configuration.

In Fig. 3, a system similar to that of Fig. 1 is shown wherein the backward wave oscillator is of arcuate configuration rather than linear. In Fig. 3, the elements of the system corresponding to those of Fig. 1 are indicated by the same reference numerals.

The electron gun 16 of Fig. 3 includes cathode 17 positioned within a recess in the cylindrical sole 14 and an accelerating anode 18. The electrons emitted from the cathode 17, partially under the influence of the electric field between the accelerating anode 18 and the cathode 17, and partially under the influence of the electric field produced between the sole 14 and the anode delay line 12 by source 25 and the transverse magnetic field B, are directed along the curved interaction space 15 between the anode delay line 12 and the sole 14, as indicated by the dashed line 11. A collector electrode 26 may be provided for interception of that portion of the electron beam which does not impinge upon the anode delay line; the collector electrode may be maintained at the same potential as the anode delay line.

In some instances, the collector electrode may be omitted and the electron stream made reentrant. Furthermore, the sole 14 may be made electron-emissive to form a continuous cathode substantially coextensive with the interaction space and the electron gun elements 17 and 18 may be omitted. The input coupling means 22 includes an inner conductor 23 which connects to one of the elements of the periodic delay network 12 at one end and which terminates in a coupling probe within the wave guide 32. The ferrite isolator assembly or attenuator 35 is tapered at both ends, as shown in Fig. 3, in order to provide a proper impedance match.

Figure 4:
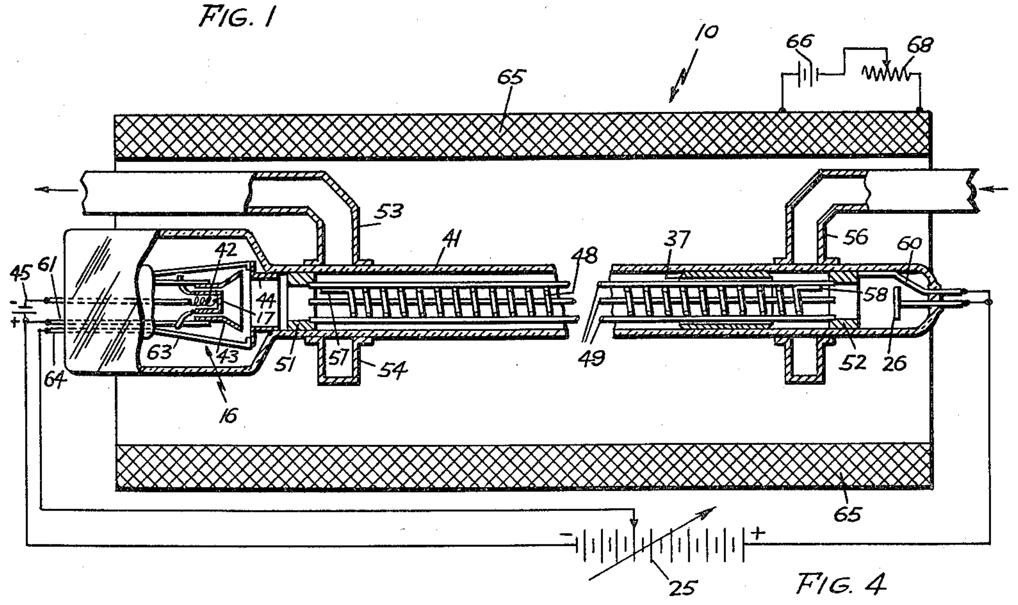
Fig. 4 is a central cross-sectional view of a portion of a system, such as shown in Fig. 1, utilizing a traveling wave oscillator having a non-reciprocal attenuating network inserted within the oscillator tube, rather than external thereto.

In Fig. 4, a traveling wave tube 10 is shown, in which an electron beam from an electron gun 16 disposed adjacent one end of the tube is accelerated by the electron gun and directed along a path adjacent the slow wave propagating network. In this tube an axial magnetic field is used for keeping the electron beam in the desired path. An evacuated envelope 41, which may be made of vitreous material, contains at one end the electron gun 16 and a collector electrode 26 adjacent the other end. The electron gun includes a cathode 17 having an electron-emissive surface heated by heater 42. The electron gun further includes a beam-forming electrode 43 which is of such configuration as to direct electrons along axial paths toward the electron collector electrode 26 and an accelerating electrode 44. The proper cathode-heater voltage is provided by a voltage source 45. A periodic slow wave energy propagating structure in the form of a helix 48 is arranged between the electron gun 16 and the collector electrode 26. The helix 48 is supported in the proper relation within the tube envelope by a plurality of ceramic rods 49, whose ends are fitted in metallic sleeves 51 and 52 secured to the portions of the inner wall of the tube envelope 41 adjacent opposite ends thereof, as shown in Fig. 4.

Energy is extracted from the helix of the traveling wave tube by means including a wave guide 53 having a shorted termination 54. Energy from a locking signal source, such as source 30 of Fig. 1, is coupled to the other end of the helix by way of a wave guide 56. The input and output ends of helix 48 are terminated with short linear portions or extensions 57 and 58, respectively. The straight portion 57 between the output end of the helix and the sleeve 51 permits energy to be coupled from the helix to the output wave guide 53. Similarly, input energy from the locking signal source is coupled into the input end of the helix through the input wave guide 56 by means of the linear portion or extension 58 of helix 48. Tuning of the oscillator of Fig. 4 may be achieved by varying the electron beam velocity. The beam velocity, in turn, is dependent upon the magnitude of the voltage between the anode delay line or helix 48 and the cathode 17, that is, upon the potential of source 25.

Although the slow wave propagating network disclosed in Fig. 4 is a helix, the invention is not limited to traveling wave tubes having this particular type of periodic network. For example, apertured vane-type structures may be used in lieu of the helix.

The helix 48 is maintained positive with respect to the cathode 17 by means of a potential source 25, whose positive terminal is connected by way of a lead-in 60 to the sleeve 52, and whose negative terminal is connected to the cathode lead 61. The collector electrode 26 may be connected directly to the helix, as shown in Fig. 4, or may be at a potential of about the same order of magnitude as that of the helix with respect to the cathode. The accelerating electrode 44 is maintained at a positive potential with respect to the cathode, which is somewhat lower than the helix-to-cathode voltage. Electrode 44 is electrically connected to a tap on the voltage source 25 through a path including the supporting structure 63 and lead-in 64.

A tubular ferrite element 37 surrounds the helix near the input end thereof and may be attached to the inner wall of the tube envelope. The axial magnetic field for focusing the beam may be used also as part of the ferrite isolator assembly for magnetically biasing the ferrite element 37 and is provided by means of the coil 65. Coil 65 may be energized by means of a unidirectional source 66 connected in series with a potentiometer 68 for varying the strength of the axial magnetic field. This magnetic field, like the biasing magnetic field mentioned in connection with the devices of Figs. 1 to 3, should be of the right magnitude to produce ferromagnetic resonance in the ferrite element. The radio frequency magnetic field in the traveling wave tube is in a plane normal to the static biasing magnetic field, in the case of the helix traveling wave tube, and the transverse magnetic components of the electromagnetic field are elliptically polarized. In order to provide a proper impedance match, the ferrite element 37 may be tapered at both ends, as indicated in Fig. 4.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external signal of substantially said predetermined frequency to said input coupling device, and non-reciprocal electrical attenuating means disposed between said means for supplying and said output means, said attenuating means introducing substantial attenuation of wave energy only to energy traveling toward said input coupling device.

2. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external signal of substantially said predetermined frequency to said input coupling device, and non-reciprocal electrical attenuating means positioned in proximity with said periodic structure adjacent the end thereof toward which said electron beam is directed, said attenuating means introducing substantial attenuation of wave energy only to energy traveling toward said input coupling device.

3. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external signal of substantially said predetermined frequency to said input coupling device, and non-reciprocal electrical attenuating means positioned between said means for supplying and said input coupling device, said attenuating means introducing substantial attenuation of wave energy only to energy traveling toward said input coupling device.

4. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external signal of substantially said predetermined frequency to said input coupling device, and non-reciprocal electrical attenuating means disposed between said means for supplying and said output means, said attenuating means including a ferrite element and means for producing a magnetic field in the region of said element, said attenuating means introducing substantial attenuation of wave energy only to energy traveling toward said input coupling device.

5. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron is directed for removing energy propagating along said structure, an input coupling device coupled to a portion of said periodic structure adjacent the end thereof toward which said electron beam is directed, means for supplying an external signal of substantially said predetermined frequency to said input coupling device, and non-reciprocal electrical attenuating means positioned in proximity with said periodic structure adjacent the end thereof toward which said electron beam is directed, said attenuating means including a ferrite element and means for producing a magnetic field in the region of said element, said attenuating means introducing substantial attenuation of wave energy only to energy traveling toward said input coupling device.

6. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external signal of substantially said predetermined frequency to said input coupling device, and non-reciprocal electrical attenuating means positioned between said means for supplying and said input coupling device, said attenuating means including a ferrite element and means for producing a magnetic field in the region of said element, said attenuating means introducing substantial attenuation of wave energy only to energy traveling toward said input coupling device.

7. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external signal of substantially said predetermined frequency to said input coupling device and including an electrical energy transmission path, and non-reciprocal electrical attenuating means positioned in said transmission path, said attenuating means introducing substantial attenuation of wave energy only to energy traveling toward said input coupling device.

8. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external signal of substantially said predetermined frequency to said input coupling device and including an electrical energy transmission path, and non-reciprocal electrical attenuating means positioned in said transmission path, said attenuating means including a ferrite element and means for producing a magnetic field in the region of said element, said attenuating means introducing substantial attenuation of wave energy only to energy traveling toward said input coupling device.

9. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external locking signal of substantially said predetermined frequency to said input coupling device including a rectangular wave guide, and non-reciprocal electrical attenuating means, said attenuating means including a ferrite element positioned along the longitudinal axis of said wave guide and means for producing a magnetic field in the region of said element.

10. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, said means for directing including means for establishing an electric field normal to said path and means for producing a magnetic field transverse to both said path and said electric field, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external locking signal of substantially said predetermined frequency to said input coupling device including a rectangular wave guide, and non-reciprocal electrical attenuating means, said attenuating means including a ferrite element asymmetrically positioned along the longitudinal axis of said wave guide and means for producing a magnetic field in the region of said element which is normal to the first mentioned magnetic field.

11. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, said means for directing including means for establishing an electric field normal to said path and means for producing a magnetic field transverse to both said path and said electric field, means for varying said electric field, and, hence, the operating frequency of said oscillator in response to changes in the potential of said periodic structure relative to a fixed reference point of said oscillator, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external locking signal of substantially said predetermined frequency to said input coupling device including a rectangular wave guide, and non-reciprocal electrical attenuating means, said attenuating means including a ferrite element asymmetrically positioned along the longitudinal axis of said wave guide and means for producing a magnetic field in the region of said element.

12. In combination, a traveling wave oscillator including means for directing a beam of electrons along an extended path, a periodic slow wave energy propagating structure positioned adjacent said path in which there is induced by the electron beam an electromagnetic wave to generate oscillatory energy of a predetermined frequency, said means for directing including means for establishing an electric field normal to said path and means for producing a magnetic field transverse to both said path and said electric field, means for varying said electric field, and, hence, the operating frequency of said oscillator in response to changes in the potential of said periodic structure relative to a fixed reference point of said oscillator, output means coupled to a portion of said periodic structure adjacent the end thereof away from which the electron beam is directed for removing energy propagating along said structure, an input coupling device coupled to a portion of said periodic structure adjacent the end thereof toward which said electron beam is directed, means for supplying an external locking signal of substantially said predetermined frequency to said input coupling device including a rectangular wave guide, and non-reciprocal electrical attenuating means, said attenuating means including a ferrite element aysmmetrically positioned along the longitudinal axis of said wave guide and means for producing a magnetic field which is normal to the first-mentioned magnetic field.

References Cited in the file of this patent

UNITED STATES PATENTS 2,748,263 Whinnery -------------- May 29, 1956
2,770,722 Arams ---------------- Nov. 13, 1956

OTHER REFERENCES

Proc. I.R.E.,vol. 42, pp. 1188–1189, July 1954, "Non-Reciprocal Loss in Traveling-Wave Tubes Using Ferrite Attenuators," Cook et al.

UNITED STATES PATENT OFFICE

CERTIFICATE OF CORRECTION

Patent No. 2,922,956 January 26, 1960

Edward C. Dench

It is hereby certified that error appears in the above numbered patent requiring correction and that the said Letters Patent should read as corrected below.

In the single sheet of drawings, line 2, and in the heading to the printed specification line 2, title of invention, for "TRAVELING WAVE OSCILLATOR SYSTEMS" read -- TRAVELING WAVE OSCILLATORY SYSTEM --; column 7, line 5, after "electron" insert -- beam --.

Signed and sealed this 26th day of July 1960.

(SEAL)
Attest:

KARL H. AXLINE
Attesting Officer

ROBERT C. WATSON
Commissioner of Patents